(12) United States Patent
Lotinsky et al.

(10) Patent No.: US 11,775,606 B2
(45) Date of Patent: Oct. 3, 2023

(54) INTER-BROWSER PRESENTATION CONTROL

(71) Applicant: Weld North Education LLC, Scottsdale, AZ (US)

(72) Inventors: Ian Michael Lotinsky, Ponte Vedra, FL (US); Brendan English, Washington, DC (US); Christopher Vincent Salvato, Colorado Springs, CO (US)

(73) Assignee: Weld North Education LLC, Scottsdale, AZ (US)

(*) Notice: Subject to any disclaimer, the term of this patent is extended or adjusted under 35 U.S.C. 154(b) by 0 days.

(21) Appl. No.: 17/677,420

(22) Filed: Feb. 22, 2022

(65) Prior Publication Data
US 2023/0133930 A1    May 4, 2023

Related U.S. Application Data

(60) Provisional application No. 63/273,208, filed on Oct. 29, 2021.

(51) Int. Cl.
| G06F 15/16 | (2006.01) |
| G06F 16/955 | (2019.01) |
| H04L 67/025 | (2022.01) |
| G06F 3/0483 | (2013.01) |

(52) U.S. Cl.
CPC ........ *G06F 16/9566* (2019.01); *G06F 3/0483* (2013.01); *H04L 67/025* (2013.01)

(58) Field of Classification Search
None
See application file for complete search history.

(56) References Cited

U.S. PATENT DOCUMENTS

| 10,955,999 | B2 |  | 3/2021 | Lotinsky et al. |
| 11,330,026 | B1 | * | 5/2022 | Han ................... H04L 12/1827 |
| 2007/0180382 | A1 | * | 8/2007 | Kortum ............. H04N 7/17309 725/37 |
| 2013/0218978 | A1 | * | 8/2013 | Weinstein ............ H04L 65/401 709/205 |
| 2014/0168453 | A1 | * | 6/2014 | Shoemake .............. H04L 67/10 348/207.11 |
| 2018/0124136 | A1 | * | 5/2018 | Faulkner ............ H04L 65/4015 |
| 2020/0094150 | A1 | * | 3/2020 | Miura ..................... H04L 51/52 |
| 2022/0261635 | A1 | * | 8/2022 | Anthony .................. G06N 3/08 |
| 2022/0318956 | A1 | * | 10/2022 | Xu ........................ G06V 10/776 |

* cited by examiner

*Primary Examiner* — Phuoc H Nguyen
(74) *Attorney, Agent, or Firm* — Vorys, Sater Seymour and Pease LLP; Michael V. Messinger

(57) ABSTRACT

Computer-implemented systems and methods for controlling presentation in a web application among remote users over a data network. A web application has a remote control user-interface (UI) element that allows one to turn on or off remote control presentation. Presentation data is shared in the web application among remote users depending on whether the remote control UI element is turned on or off. A system includes an inter-browser controller coupled to the web application. The web application outputs a page having a remote control UI element. The inter-browser controller controls sharing of presentation data selected by a first user through the web application to other remote users depending on whether the remote control UI element is turned on or off.

20 Claims, 7 Drawing Sheets

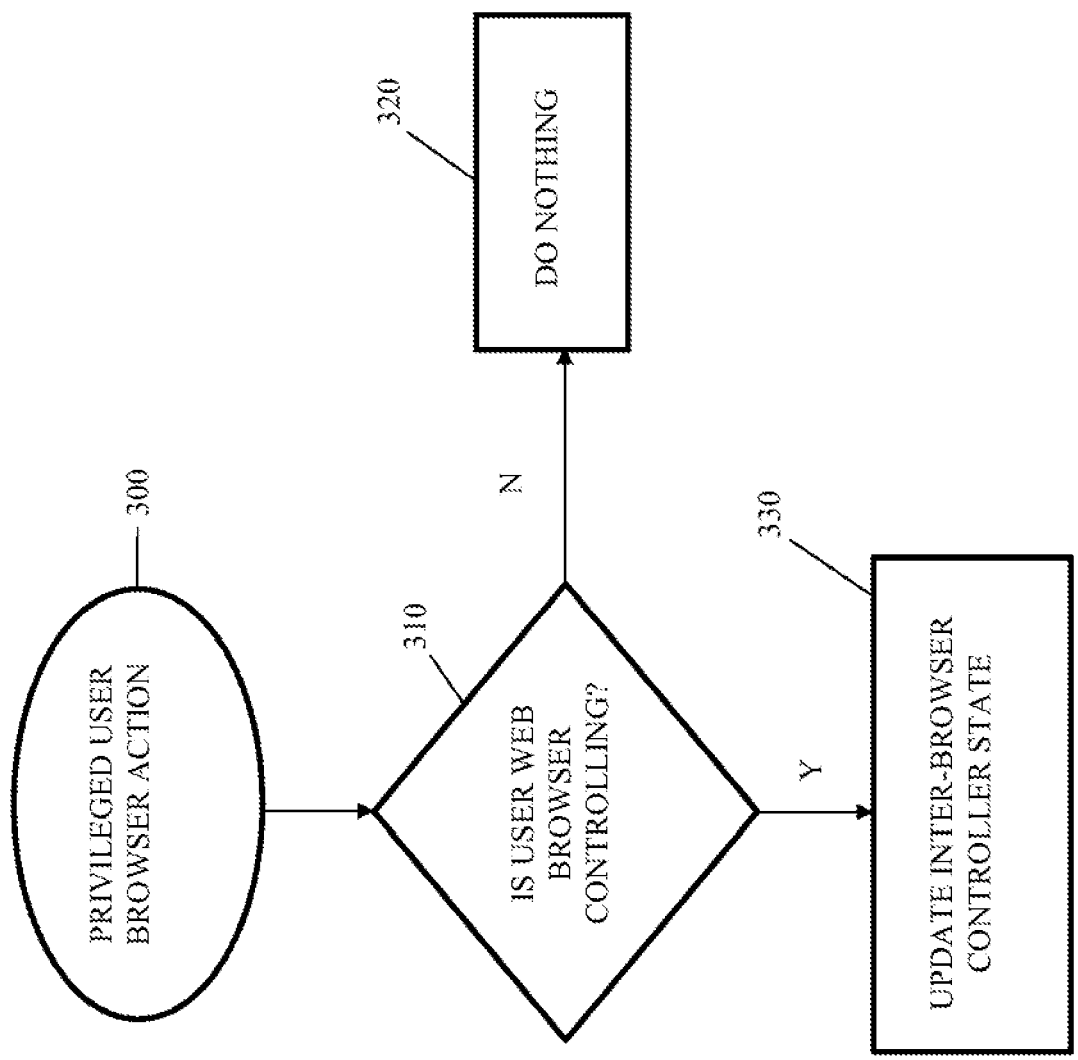

INTER-BROWSER PRESENTATION CONTROL

This application claims the benefit of priority to U.S. Provisional Application No. 63/273,208, filed Oct. 29, 2021, incorporated by reference in its entirety herein.

TECHNICAL FIELD

The field relates to online presentation and electronic browser control.

RELATED ART

Online applications allow multiple users to view and share content with one another. An online application may be part of an online platform coupled to a contact management system. The online platform may host the online application. The online platform can manage access rights and communications between remote users and serve content from a content management system to instances of an online application running on remote computing devices. The content management system may store and generate electronic content for output through the online platform to users for display, viewing, editing or manipulation. A content management system can be used with a number of online applications to deliver content for education, business, government, non-profit services, or other applications.

Increasingly, online applications are web applications accessed by users through web browsers (also called browsers). Web applications are built to support World Wide Web protocols and technology over one more data networks including a local area network, medium area network, or wide area network, such as, the Internet. Web applications have gained in popularity as they allow remote users to more easily use their browsers to access and operate web applications. Ease of access and operation is especially important in many sectors, such as, education, where users having a range of experience or knowledge need to be accommodated.

Despite their popularity, browsers have limitations with respect to their use in web applications. Browsers were originally designed to support getting and fetching web pages from Web servers over the World Wide Web. Remote users independently controlled operation and navigation through their respective browsers. Similarly with the rise of web applications, remote users at a browser remain restricted to independent and generally passive operation of a browser in the web application.

In contrast, separate online meeting tools have been developed which allow users to meet virtually over a network and communicate through audio and/or video with one another. These tools, such as, a Zoom Meeting or Phone product, or Microsoft Teams tool, or Google Meet tool allow users to meet virtually and allow users to control which user is presenting a display or content to other users. These tools however only operate separately from other web applications.

BRIEF SUMMARY

Computer-implemented methods, systems and computer-readable storage medium are provided for inter-browser presentation control.

In an embodiment, a computer-implemented method for controlling presentation in a web application among remote users over a data network is provided. The method includes outputting to a first user a page in the web application having a remote control user-interface (UI) element. Further steps are enabling the first user to turn on or off remote control presentation through a selection made with the remote control user-interface (UI) element and sharing presentation data selected by the first user through the web application to other remote users depending on whether the remote control UI element is turned on or off.

In another embodiment, a computer-implemented system for inter-browser presentation control among remote users of a web application shared over a network is provided. The system includes a web application and an inter-browser controller. The web application is configured to output to a first user a page in the web application having a remote control user-interface (UI) element. The remote control UI element is configured to enable the first user to turn on or off remote control presentation through a selection made with the remote control UI element.

In a further aspect, the inter-browser controller controls sharing of presentation data selected by the first user through the web application to other remote users depending on whether the remote control UI element is turned on or off.

In an embodiment, the system further includes computer-readable memory coupled to the inter-browser controller. The memory stores inter-browser controller state information and the inter-browser controller manages updates to the stored inter-browser controller state information.

In another aspect, the inter-browser controller state information includes group state information identifying a join group and whether remote sharing control is on or off, and the inter-browser controller manages changes to the group state information.

In a still further aspect, the inter-browser controller state information includes individual user state information. This includes state information corresponding to inputs made by respective users with respect to associated content on a page. The inter-browser controller changes individual state information in response to respective user inputs and communicates with the web application to share updated individual state information corresponding to the individual inputs made by a user to other remote users when the remote control UI element is turned on.

Further embodiments, features, and advantages of the invention, as well as the structure and operation of the various embodiments of the invention are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

FIG. 3 is a flowchart diagram of a routine for privileged user browser action in accordance with an embodiment.

DETAILED DESCRIPTION

Figure 1:
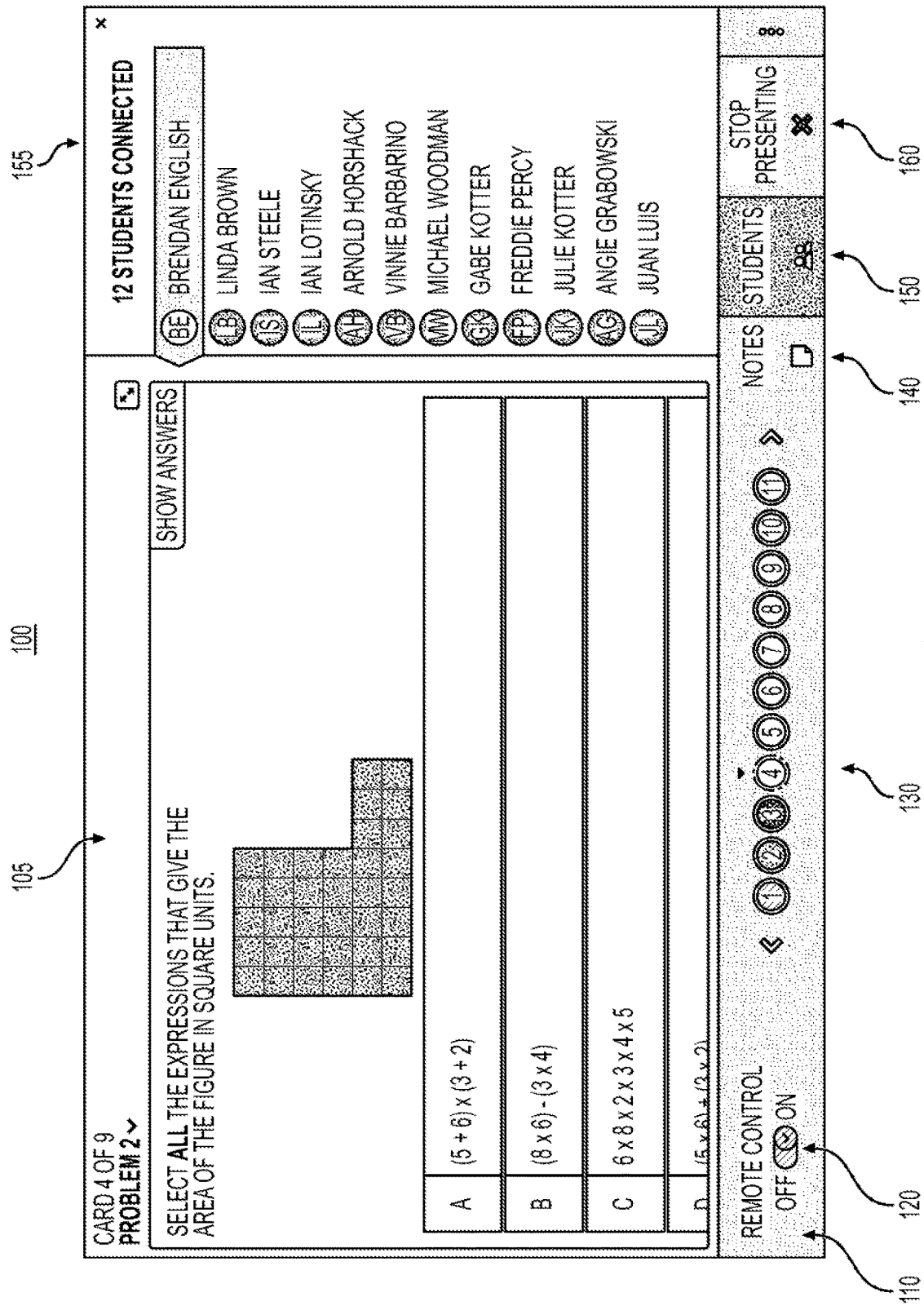
FIG. 1 is a diagram of an example web application page having inter-browser presentation control according to an embodiment of the present invention.

The inventors recognized what is needed is an inter-browser control that enables remote users to control who is presenting content to other users in a web application. The inventors recognized an inter-browser control is needed which does not require users of a web application, such as, an online education web application, to switch to a separate meeting tool to control presentation by different users.

Embodiments of the present invention provide computer-implemented methods and systems having remote inter-browser control for a web application. In an embodiment, remote control is enabled or disabled through a user-interface (UI) element provided on a web application page. The UI element enables a user to remotely control presentation of a page in a web application.

Embodiments refer to illustrations described herein with reference to particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

In the detailed description of embodiments herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In embodiments, computer-implemented methods and systems allow a privileged user to control other users' browser location, page, state, and components, while preserving the ability for the other users to use the browser page with or without interference. The privileged user provides a mechanism to join a controlled session. Examples of mechanisms may include, but are not limited to, a URL, short URL, text code, or QR code. Other users utilize mechanisms to join the controlled session.

The privileged user can switch control on or off at any time. When control is turned on, the privileged user controls which URL, page components or content (static, audio, video, etc.) the other users see in their browser for the controlled session. Actions the privileged user takes will communicate state changes to the other users' browsers to mimic. The privileged user may control only the URL or page but may further control the entirety of the page so that the other users cannot take any action on it. When control is turned off, the privileged user and other users can navigate independently without impacting each other's experience.

Regardless of the level of control, the other users' URL, page, and other state information are transmitted to the privileged user so they can monitor the users' independent activity and decide whether to keep control off or to re-enable it so they can regain control of the other users' browsers.

In one application, computer-implemented methods and systems with browser control as described herein enable better distance learning between educators and students without the need for separate proprietary software deployment, installation, and management.

Browser control as described herein may be implemented in any web application coupled to an online platform having content delivery where a privileged user may want to control the browser experience of other users. This may include online platforms used in education, such as, an online platform and content management system available from LearnZillion, Inc. or Weld North Education LLC. An online application may be a web application accessed through a browser on a computing device or a downloadable application implemented on a computing device.

In one embodiment, a first user (a privileged user with associated rights) may select the UI element to enable other remote users to have control over presentation on a web application page. For example, the first user may be a privileged user, such as an instructor. The instructor may then remotely select the UI element to allow other remote users, such as, one or more students to control presentation on the web application page. This control when enabled may allow a remote user to select content that appears on the web application page. This may include selecting one more content items, such as, starting or pausing audio or video files, inputting text, answering questions, navigating slides or images, selecting pages or content items to be viewed, or other presentation inputs.

In another embodiment, any remote user of the web application may select the UI element to have control over presentation on a web application page. Once the remote user selects the remote control UI element, the remote user is recognized as the privileged user with associated rights and has control over presentation on the web application page.

As described above, when remote control is turned on, the privileged user controls which URL, page components or content (static, audio, video, etc.) the other users see in their browser for the controlled session. Actions the privileged user takes will communicate state changes to the other users' browsers to mimic. The privileged user may control only the URL or page but may further control the entirety of the page so that the other users cannot take any action on it. When control is turned off, the privileged user and other users can navigate independently without impacting each other's experience.

Example Web Application Page

FIG. 1 shows an example web application page 100 according to an embodiment. Page 100 includes a display area 105 and a menu bar 110. Display area 105 is an area that displays one or more content items. Menu bar 110 includes a remote control UI element 120. Remote control UI element 120 enables a privileged user to allow a remote user to select content that appears on the web application page. For example, as shown in FIG. 1, remote control UI element 120 may be a switch (off/on) that can be switched on to allow remote users to control presentation of content items on page 100. Switch 120 may be switched off to not allow remote users to control presentation of content items on page 100. UI element 120 is illustrative and not intended to be limiting.

A slider, radio buttons, menus, or other type of UI controls may be used. Menu bar 110 may also include a page selection control 130 that enables a user to select one or more pages to be displayed. Other controls 140-160 may be also provided. Notes button 140 enables a user to input notes. Students button 150 allows a user to open a pop up window 155 to see other remote users (students) viewing the page. Stop button 160 enables a user currently presenting a page view to stop presenting. Other controls (indicated by an ellipsis in FIG. 1) may also be provided depending on a particular application or available screen space.

In one embodiment, page 100 is displayed as part of a session controlled by an online web application. This web application may include for example an online web application available from LearnZillion, Inc. or Weld North Education LLC. The online web application may allow an instructor to build and store content for an online presentation in a content management system. The content may include a lesson plan, assignments, quiz, test, or other type of education content. Content items output on a page 100 may be text, images, audio, video, hyperlinks, or other types of content. For example, instructional content may be obtained from servers for output to browsers as described in U.S. Pat. No. 10,955,999 by Lotinsky et al. and incorporated by reference herein in its entirety.

In one example, an instructor can select remote control 120 to enable control to be given to a particular student. For example, as shown in FIG. 1 an instructor may select a first student, Brendan English, which is then highlighted in window 155. The instructor then may select remote control button 120 to enable the first student to control content presented on page 100. The first student may then input selections in page area 105 for example to answer a question being displayed. The first student may also toggle to a different page through page selection control 130 or perform other inputs.

By turning on remote control 120 and selecting the first student as the privileged user, the web application then responds to the privileged user and controls which URL, page components or content (static, audio, video, etc.) the other users see in their browser for the controlled session. Actions the privileged user takes will communicate state changes to the other users' browsers to mimic. The privileged user may control only the URL or page but may further control the entirety of the page so that the other users cannot take any action on it. When control is turned off, the privileged user and other users can navigate independently without impacting each other's experience.

Online Platform with Inter-Brower Control

Figure 2A:
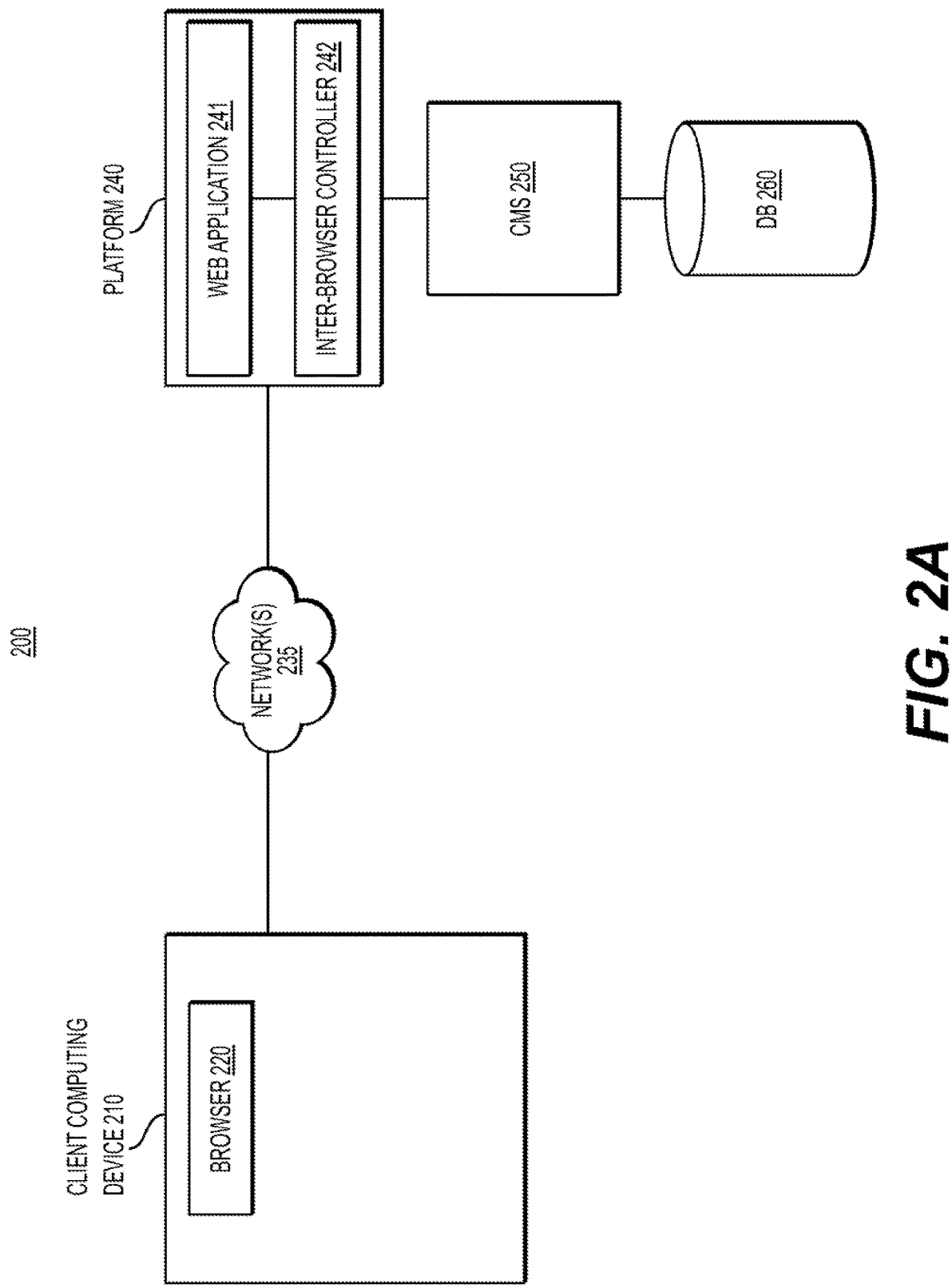
FIG. 2A is a diagram of a system having inter-browser presentation control in accordance with an embodiment.

FIG. 2A is a diagram of a system 200 having inter-browser control an according to an embodiment. System 200 includes one or more client computing devices 210 coupled to an online platform 240 over one or more data networks 235. Client computing device 210 includes browser 220. Online platform 240 includes web application 241 and inter-browser controller 242. Online platform 240 is also coupled to a content management system 250 and one or more databases 260.

Web application 241 is hosted on online platform 241. A remote user can access web application 241 through browser 220. According to a feature, web application 241 includes or is coupled to inter-browser controller 242 to control presentation of content on displays of one or more remote client computing devices 210 as described above with respect to FIG. 1. For example, web application 241 outputs a page 100 having remote control UI element 120.

Inter-browser controller 242 controls data presented to other remote users according to the setting of remote control UI element 120. Inter-browser controller 242 receives data and signals from web application 241 which correspond to user inputs made at browser 220. When a privileged user turns on remote control at his or her browser 220, a signal is sent through web application 241 to inter-browser controller 242. When remote control is on, inter-browser controller 242 controls which URL, page components or content (static, audio, video, etc.) other remote users see in their respective browsers during a controlled session. Actions the privileged user takes in the web application 241 will be communicated as state changes to the other users' browsers to mimic. The privileged user may control only the URL or page but may further control the entirety of the page so that the other users cannot take any action on it. When control is turned off, inter-browser controller 242 will be turned off and will allow the privileged user and other users to navigate independently without impacting each other's experience.

In embodiments, one or more client computing devices 210 may be coupled over communication links to one or more networks 235. Online platform 240 may include content management system 250 coupled to one or more databases 260. Network(s) 235 can be any data network or combination of data networks, including but not limited to, a computer or telephony network, local area computer network, medium area network or the Internet.

In one implementation, online platform 240 may be implemented on one or more servers running on one or more computing devices at the same or different locations. A server can be any type of data server including, but not limited to, a server that can execute or support an application interfacing on remote client computing devices. A web server can also be coupled to a server or can be a part of server. A server in content management system 250 can also manage and access data stored in one or more databases 260. Each database 260 may be a relational database or other type of database.

Inter-browser controller 242 may be implemented on one or more processors and coupled to a memory device that stores inter-browser controller state information.

Operation

Figure 2B:
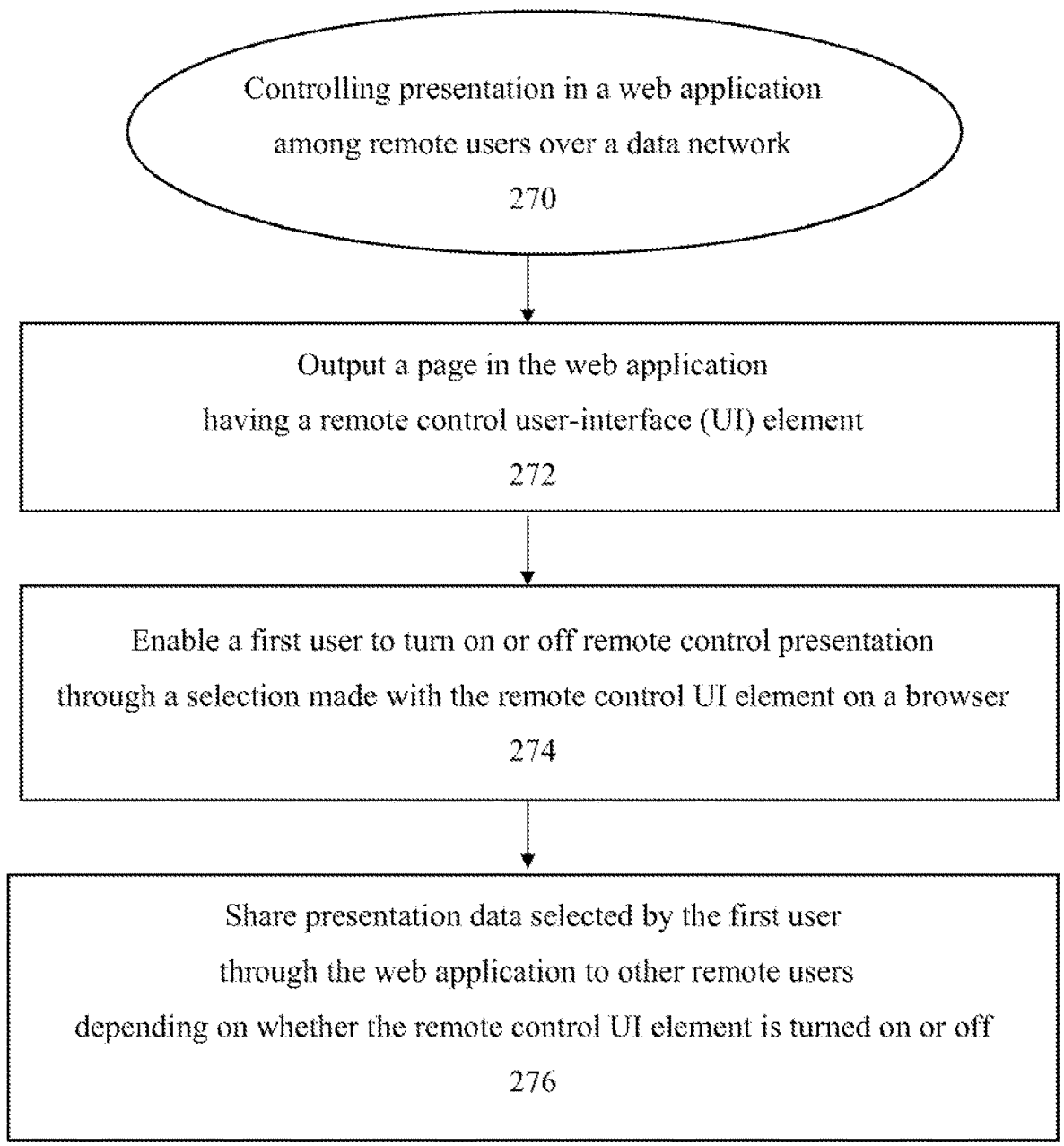
FIG. 2B is a flowchart diagram of a computer-implemented method for controlling presentation in a web application among remote users in accordance with an embodiment.

FIG. 2B is a flowchart diagram of a computer-implemented method 270 for controlling presentation in a web application among remote users in accordance with an embodiment (steps 272-276). In one embodiment, method 270 including each of steps 272-276 may be carried out by web application 241.

In step 272, web application 241 outputs to a first user a page having a remote control user-interface (UI) element. For example, web application 241 may output page 100 having menu bar 110 with a remote control UI element 120 to a browser for rendering for display to a first user at a client computing device 210.

Next, web application 241 enables the first user to turn on or off remote control presentation through a selection made with remote control user-interface (UI) element 120 (step 274). For example, web application 241 may receive a signal indicative of the user selection and report to inter-browser controller 242 to update state information accordingly.

Finally in step 276, web application 241 shares presentation data selected by the first user through the web application to other remote users depending on whether the remote control UI element 120 is turned on or off. For example, web application 241 may output presentation data to requesting browsers of remote users according to the updated state information when remote sharing is on. In this way, state changes are communicated to browsers of other remote users to mimic state changes made at a first user browser (having control of presentation) when remote control is turned on. Otherwise, when remote sharing is off, users may navigate on their own browsers independently and updated state information changes made by one user are not communicated to other users. State information is managed by inter-browser controller 242 coupled to web application 241. The operation of system 200 including inter-browser controller 242 is described further with respect to an example operation between a privileged user and a group of follower users.

Example Privileged User and Follower User Operation with Remote Sharing

Figure 5:
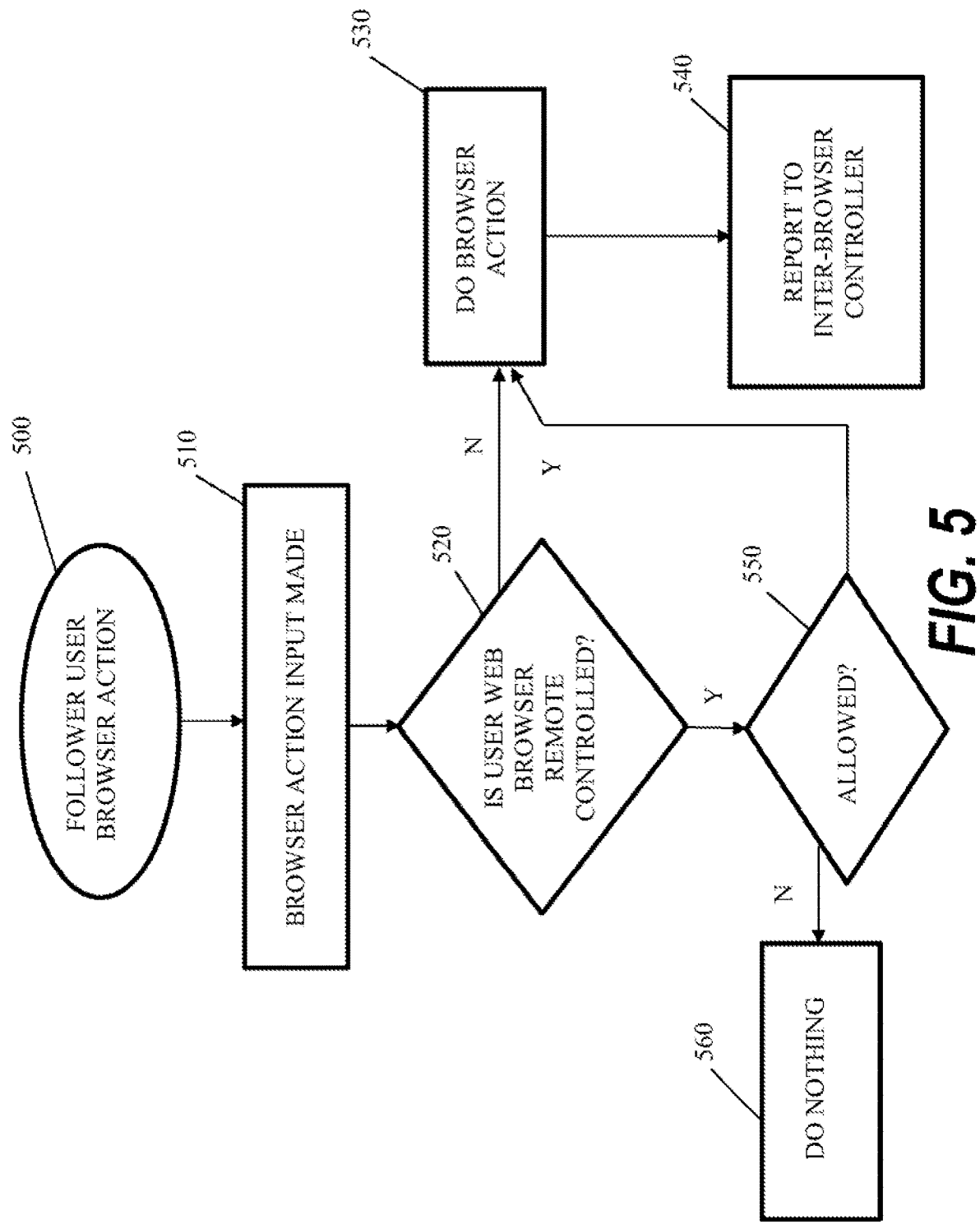
FIG. 5 is a flowchart diagram of a routine for follower user browser action in accordance with an embodiment.
Figure 6:
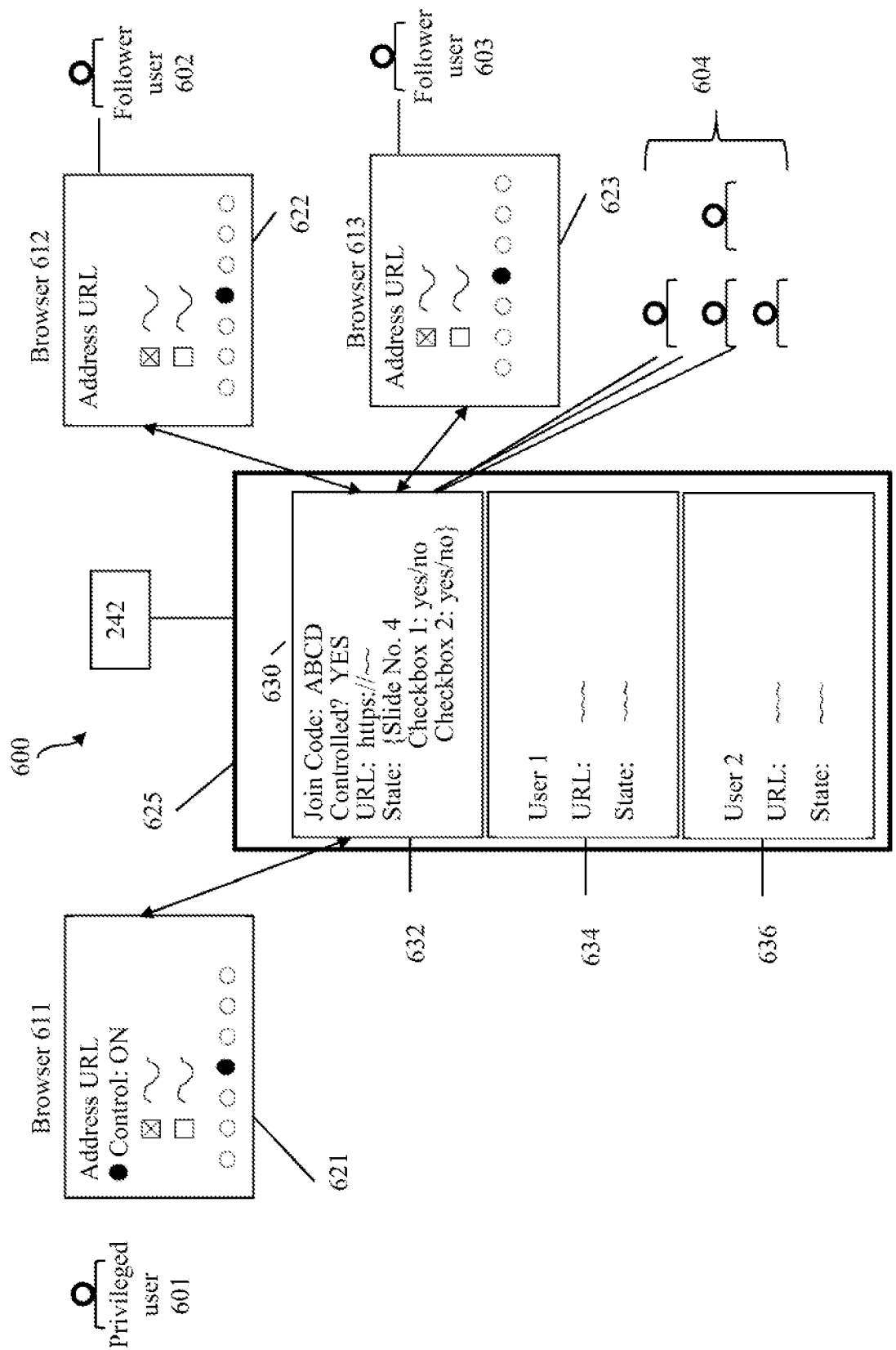
FIG. 6 is a diagram showing example data communication and state updates between an inter-browser controller and user browsers in a joined group according to an embodiment.

The operation of inter-browser presentation on system 200 is described further with respect to a group of users where presentation control can be shared between a privileged user and one or more follower users. For brevity, the operation is described with reference to computer-implemented routines shown in FIGS. 3-5 and an example joined group in FIG. 6. These examples are illustrative and not intended to be limiting. For example, as shown in FIG. 6, a privileged user 601 (e.g., a teacher interacting with a browser 611) may carry out a lesson plan with a group of follower users 602-604 (e.g., students interacting with respective browsers 612, 613 and other browsers not shown for clarity). The lesson plan may have multiple slides or other display views of content relating to the lesson plan. As shown in the example in FIG. 6, browser 611 may display a web page 621 having a display panel showing a slide 4 in the lesson plan with a question requiring a student to select one of two checkboxes. Web page 621 also includes menu bar having a remote control switch (on/off) to control remote browser presentation.

FIG. 6 further shows example inter-browser controller state information 630 that is managed by inter-browser controller 242. Inter-browser controller 242 is coupled to a memory device 625 that stores inter-browser controller state information 630. Inter-browser state information 630 includes group state information 632 and individual user state information 634-636. Group state information 632 may be a join code, whether remote control browser sharing is on or off, and a URL or address of content to be displayed (such as lesson plan). Further state information relating to the content is also stored. For example, the content state information may be state information on content inputs (such as, an identifier for the slide 4 of the lesson plan content, and state information on whether two checkboxes in slide 4 are selected.) Individual user state information 634, 636 may be state information corresponding to inputs made by users 601, 602 when they are a privileged user or a follower user when they have remote sharing control or are allowed to input. State information 634, 636 as shown may include a URL and content state information. The URL or address identifies content to be displayed (such as lesson plan). Content state information may be state information on content inputs (such as, an identifier for the slide 4 of the lesson plan content, and state information on whether two checkboxes in slide 4 are selected.) For brevity, two user state information block 634, 636 are shown but in practice user state information is stored and managed for each user of a joined group.

During an initialization, inter-browser controller 242 (receiving input from web application 241) may initialization inter-browser controller state information 630. This can include creating a join code and adding any other initial group state information 632 or individual user state information 634-636 for users in the group. A join code may be for example a meeting ID or address users may use to join in a group. Inter-browser controller 242 can also designate one of the users as privileged user 601 and others as follower users 602-604, and set remote control on or off as a default setting.

During operation when remote control is on, follower users 602-604 may use their respective browsers to input an answer on slide 4. In the joined group, each user views the pages selected for display and inputs to those pages made by the privileged user 621. For instance, user 602 may input a check to select a first checkbox. Inter-browser controller 242 then propagates updated state information such that each user 601-604 in the joined group views an updated page showing the selected first checkbox. In this way, presentation control is shared online with others users across different browsers. If remote control is off, then browser inputs made by follower users 602-604 is not shared amongst the joined group.

In a still further example, a privileged user 601 may control which follower user 602-604 is able to provide input. In this way, a privileged user 601 can effectively 'call on' a student for an answer. Only the input made by the called on student is shared with the joined group. For example, user 601 can select a particular student from a menu 155 or the user-interface element.

FIG. 3 is a flowchart diagram of a routine 300 for privileged user browser action in accordance with an embodiment (steps 310-330). Routine 300 is carried out by inter-browser controller 242 in response to a privileged user 601 action on browser 611 (such as selecting a new slide or a checkbox on a current slide). In step 310, inter-browser controller 242 checks if the user web browser 611 is controlling. Inter-browser controller 242 checks state information 630. In particular, group state information 632 is checked to confirm remote control sharing is on for the joined group and the privileged user 601 is presenting. If no, remote sharing is not on and the user 601 is not presenting, then control proceeds to do nothing (step 320). In this case, the privileged user action at browser 611 is not propagated to the follower users 602-604.

If yes the privileged user 601 browser 611 is controlling, control proceeds to step 330. In step 330, inter-browser controller 242 updates state information 630. In particular, state information 634 is updated to represent the action privileged user 601 made on browser 611 (such as selecting a new slide or a checkbox on a current slide). If user 601 selected a first checkbox on slide 4 displayed on page 621 using browser 611, then state information 634 for user 601 (User 1) is updated to indicate Checkbox 1 is now YES. Similar updates to state information 634 (or group state information 632) may be made in response to other privileged user 601 inputs such as selecting Checkbox 2, a new slide number, a new lesson plan or other content at a new URL, or switching off remote control or stopping presentation.

Figure 4:
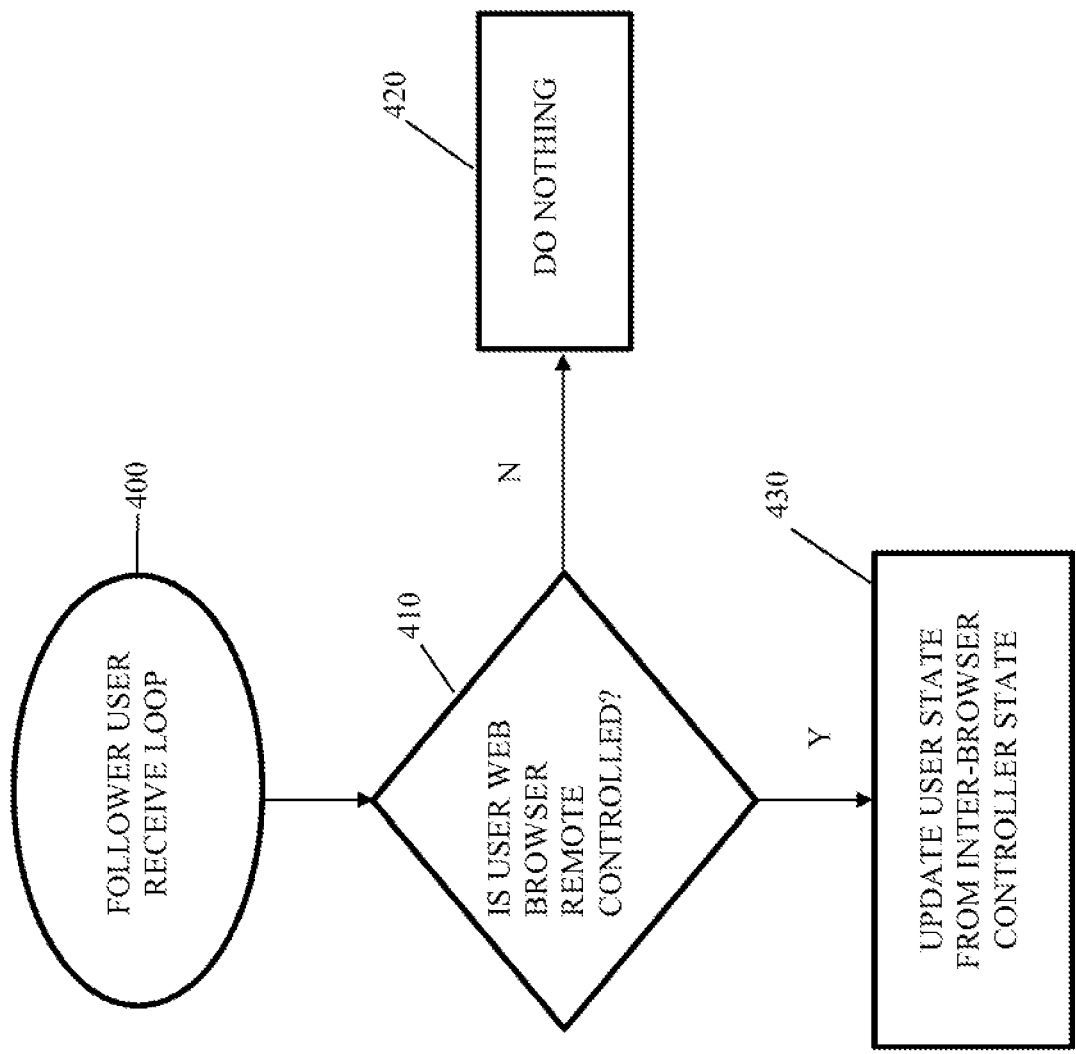
FIG. 4 is a flowchart diagram of a routine for follower user browser receive operation in accordance with an embodiment.

During operation when privileged user 601 is presenting, follower users 602-604 at respective browsers receive and view pages output by web application 241 under the control of inter-browser controller 242. FIG. 4 is a flowchart diagram of a routine 400 for follower user browser receive operation in accordance with an embodiment (steps 410-430). In step 410, inter-browser controller 242 checks if a follower user web browser is remote controlled. Inter-browser controller 242 checks state information 630. In particular, group state information 632 is checked to confirm remote control sharing is on for the joined group and a privileged user is presenting. If no, remote sharing is not on and the user is not presenting, then control proceeds to do nothing (step 420). In this case, with remote sharing off and not presenting, the inter-browser controller state information 630 is not propagated to the follower user. In other words, for a follower user 602 his or her associated user state information 636 is not updated.

If yes, remote sharing is on and the privileged user is presenting, control proceeds to step 430. In step 430, inter-browser controller 242 updates state information 636 associated with follower user 602. In particular, state information 636 is updated to represent the action privileged user 601 action made on browser 611 (such as selecting a new slide or a checkbox on a current slide). If the privileged user selected a first checkbox on slide 4 displayed on page 621 using browser 611, then state information 636 for follower user 602 is updated to indicate Checkbox 1 is now YES. Similar updates to follower user state information 636 (or group state information 632) may be made in response to other privileged user 601 inputs such as selecting checkbox 2, a new slide number, a new lesson plan or other content at a new URL, or switching off remote control or stopping presentation. In this way, browser 612 of a follower user 602 receives updated page information from web application 241 and renders updated page 622 on browser 612 according to updated state information 630 managed by inter-browser controller 242.

During operation remote control sharing may be passed to a follower user. For example, privileged user 601 may select remote control sharing on and a follower user 601 at respective browser 612 may then take action. FIG. 5 is a flowchart diagram of a routine 500 for follower user browser action in accordance with an embodiment (steps 510-560). Routine 500 is carried out in response to an action made by a follower user 602 on browser 612 (such as selecting a new slide or a checkbox on a current slide on page 622) (step 510).

In step 520, inter-browser controller 242 checks if the user web browser 612 is controlled. Inter-browser controller 242 checks state information 630. In particular, group state information 632 is checked to confirm whether remote control sharing is on for the joined group and whether the followed user 602 is remote controlled (i.e., there is a privileged user presenting in the joined group). If no, follower user browser 612 is not remote controlled, then control proceeds to allow the browser action input at browser 612 to be made (step 530) and reports the action input to inter-browser controller 242 (step 540).

If yes, the follower user 602 browser 612 is remote controlled by a privileged user 601 (that is remote control sharing is on), then control proceeds to step 550. Inter-browser controller 242 checks whether follower user 602 is allowed to do a certain action (step 550). If yes, action allowed, then control proceeds to step 530. If no, certain action not allowed, then control proceeds to step 560 (do nothing). In this way, with remote control on and the follower user allowed to do a certain action in step 550 like point a cursor at a slide and make a selection, the browser action input at browser 612 is allowed to be made (step 530) and the browser 612 reports the action input to inter-browser controller 242 (step 540) for propagation to other users. For example, if follower user 602 selects a checkbox 2 Yes answer in a lesson plan slide then the state information 636 for checkbox 2 is changed by inter-browser controller 242 to indicate Yes. Other users in the group then have their display pages updated to show the checkbox 2 Yes selection in accordance with output from inter-browser controller 242 through web application 241. Other certain actions of a user may be disallowed when being remote controlled by another user. For example, if a student tries to advance a slide while under remote control of another user, this action is ignored.

Further Embodiments and Example Implementations

Various embodiments can be implemented on client and server sides, for example, using one or more computing devices. A computing device (such as client computing device 210 and ones implementing platform 240 or CMS 250) can be any type of device having one or more processors and memory. For example, a computing device can be a workstation, mobile device (e.g., a mobile phone, personal digital assistant, tablet or laptop), computer, server, computer cluster, server farm, game console, smart television, set-top box, kiosk, embedded system, or other device having at least one processor and computer-readable memory. In addition to at least one processor and memory, such a computing device may include software, firmware, hardware, or a combination thereof. Software may include one or more applications and an operating system. Hardware can include, but is not limited to, a processor, memory and user interface display or other input/output device.

Aspects of computing embodiments on client and server sides (including client computing device 210, browser 220, platform 240 including components web application 241 and inter-browser controller 242, and CMS 250) may be implemented electronically using hardware, software modules, firmware, tangible computer readable or computer usable storage media having instructions stored thereon, or a combination thereof and may be implemented in one or more computing devices, computer systems or other processing systems.

System 200 may be implemented on one more computing devices. In embodiments, browser 220 can be a commercially available web browser, such as, a CHROME browser available from Google Inc., an EDGE browser (or Internet Explorer) browser available from Microsoft Inc., a SAFARI browser available from Apple Inc., or other type of browser. Client computing device 210 can be any electronic computing device that can support a browser 220. A user can enter control inputs to browser 220 through a user interface (such as a keyboard, microphone, or touchscreen) at client computing device 210.

In one embodiment, database 260 stores content including content blocks that include one or more of text content, accessibility content, text-based image definitions (e.g., scalable vector graphic (SVG)), references to external raster image assets, and references to external objects (e.g., audio files, video files, and assessment items). In one implementation, database 260 can be a relational database used with a database management system that provides JSON support. Asset object storage devices can also be used with CMS 250 on any computer-readable memory device that stores objects. This can include images, audio files, video files, etc.

Embodiments are also directed to computer program products comprising software stored on any computer-usable medium. Such software, when executed in one or more data processing devices (such as a processor), causes a data processing device(s) to operate as described herein or, as noted above, allows for the synthesis and/or manufacture of electronic devices (e.g., ASICs, or processors) to perform embodiments described herein. Embodiments employ any computer-usable or -readable medium, and any computer-usable or -readable storage medium known now or in the future. Examples of computer-usable or computer-readable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage devices, etc.), and communication mediums (e.g., wired and wireless communications networks, local area networks, wide area networks, intranets, etc.). Computer-usable or computer-readable mediums can include any form of transitory (which include signals) or non-transitory media (which exclude signals). Non-transitory media comprise, by way of non-limiting example, the aforementioned physical storage devices (e.g., primary and secondary storage devices).

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described exemplary embodiments.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer-implemented method for controlling presentation in a web application among remote users over a data network, comprising:
    outputting to a first user a page in the web application having a remote control user interface (UI) element allowing the first user to take control of web application display in respective browsers of the remote users, wherein the page output includes the remote control UI element in a browser tab or browser menu bar in a display view of a browser;
    enabling the first user to turn on or off remote control presentation through a selection made with the remote control user-interface (UI) element; and
    sharing presentation data selected by the first user through the web application to other remote users to view presented data in respective browsers of the remote users depending on whether the remote control UI element is turned on or off.

2. The computer-implemented method of claim 1, wherein the remote control UI element comprises a switch for turning remote control sharing on or off.

3. The computer-implemented method of claim 1, further comprising communicating state changes to the remote users' browsers to mimic state changes made at the first user's browser when remote control is turned on.

4. The computer-implemented method of claim 3, further comprising enabling the first user and remote users to navigate respective browsers independently without impacting each other's experience when remote control is turned off.

5. The computer-implemented method of claim 1, further comprising:
    storing inter-browser controller state information in a computer-readable memory; and
    managing updates to the stored inter-browser controller state information.

6. The computer-implemented method of claim 1, wherein the inter-browser controller state information includes group state information identifying a join group and whether remote sharing control is on or off, and the managing updates includes changing group state information.

7. The computer-implemented method of claim 6, wherein the sharing presentation data includes checking the stored group state information to determine whether the remote control UI element is turned on, and sharing the presentation data of the first user to other remote users when the remote control UI element is turned on.

8. The computer-implemented method of claim 7, wherein the sharing presentation data includes not sharing the presentation data of the first user to other remote users when the remote control UI element is turned off, whereby remote users may navigate independently on their own respective browsers.

9. The computer-implemented method of claim 7, wherein the inter-browser controller state information includes individual user state information includes state information corresponding to inputs made by respective users with respect to associated content on a page, and wherein the managing updates includes changing individual state information in response to respective user inputs, and the sharing presentation data includes sharing updated individual state information corresponding to individual inputs made by a user to other remote users when the remote control UI element is turned on.

10. The computer-implemented method of claim 1, wherein the presentation data includes instructional content and, when the remote control UI element is turned on, an input by a remote user to the presented data includes a response to the instructional content.

11. A computer-implemented system for inter-browser presentation control among remote users of a web application shared over a network, comprising;
    a web application implemented on at least one processor; and
    an inter-browser controller, implemented on at least one processor, coupled to the web application;
    wherein the web application is configured to output to a first user a page in the web application having a remote control user-interface (UI) element allowing the first user to take control of web application display in respective browsers of the remote users;
    wherein the remote control UI element is configured to enable the first user to turn on or off remote control presentation through a selection made with the remote control UI element;
    wherein the inter-browser controller controls sharing of presentation data selected by the first user through the web application to other remote users to view presented data depending on whether the remote control UI element is turned on or off; and
    wherein the page output includes the remote control UI element in a browser tab or browser menu bar in a display view of a browser.

12. The computer-implemented system of claim 11, further comprising:
computer-readable memory coupled to the inter-browser controller;
wherein the memory stores inter-browser controller state information and the inter-browser controller manages updates to the stored inter-browser controller state information.

13. The computer-implemented system of claim 12, wherein the inter-browser controller state information includes group state information identifying a join group and whether remote sharing control is on or off, and the inter-browser controller manages changes to the group state information.

14. The computer-implemented system of claim 13, wherein the inter-browser controller checks the stored group state information to determine whether the remote control UI element is turned on, and communicates with the web application to share the presentation data of the first user to other remote users when the remote control UI element is turned on.

15. The computer-implemented system of claim 13, wherein the remote users comprise a privileged user and follower users and the presentation data includes instructional content, and the inter-browser state information includes a URL to instructional content.

16. The computer-implemented system of claim 15, wherein the instructional content includes a lesson plan having one or more slides with selectable content items.

17. A computer-implemented system for inter-browser presentation control among remote users of a web application shared over a network, comprising:
a web application implemented on at least one processor; and
an inter-browser controller, implemented on at least one processor, coupled to the web application;
wherein the web application is configured to output to a first user a page in the web application having a remote control user-interface (UI) element;
wherein the remote control UI element is configured to enable the first user to turn on or off remote control presentation through a selection made with the remote control UI element;
wherein the inter-browser controller controls sharing of presentation data selected by the first user through the web application to other remote users depending on whether the remote control UI element is turned on or off;
further comprising computer-readable memory coupled to the inter-browser controller;
wherein the memory stores inter-browser controller state information and the inter-browser controller manages updates to the stored inter-browser controller state information;
wherein the inter-browser controller state information includes group state information identifying a join group and whether remote sharing control is on or off, and the inter-browser controller manages changes to the group state information;
wherein the inter-browser controller checks the stored group state information to determine whether the remote control UI element is turned on, and communicates with the web application to share the presentation data of the first user to other remote users when the remote control UI element is turned on; and
wherein the inter-browser controller checks the stored group state information to determine whether the remote control UI element is turned on, and communicates with the web application to not share the presentation data of the first user to other remote users when the remote control UI element is turned off, whereby remote users may navigate independently on their own respective browsers.

18. A computer-implemented system for inter-browser presentation control among remote users of a web application shared over a network, comprising:
a web application implemented on at least one processor; and
an inter-browser controller, implemented on at least one processor, coupled to the web application;
wherein the web application is configured to output to a first user a page in the web application having a remote control user-interface (UI) element;
wherein the remote control UI element is configured to enable the first user to turn on or off remote control presentation through a selection made with the remote control UI element;
wherein the inter-browser controller controls sharing of presentation data selected by the first user through the web application to other remote users depending on whether the remote control UI element is turned on or off;
further comprising computer-readable memory coupled to the inter-browser controller;
wherein the memory stores inter-browser controller state information and the inter-browser controller manages updates to the stored inter-browser controller state information;
wherein the inter-browser controller state information includes group state information identifying a join group and whether remote sharing control is on or off, and the inter-browser controller manages changes to the group state information; and
wherein the inter-browser controller state information includes individual user state information includes state information corresponding to inputs made by respective users with respect to associated content on a page, and wherein the inter-browser controller changes individual state information in response to respective user inputs, and communicates with the web application to share updated individual state information corresponding to the individual inputs made by a user to other remote users when the remote control UI element is turned on.

19. A computer-implemented system for controlling presentation in a web application implemented on at least one processor among remote users over a data network, comprising:
means for outputting to a first user a page in the web application having a remote control user-interface (UI) element configured to be shown in a browser tab or menu bar of a display view and to allow the first user to take control of the corresponding web application display at browsers of remote users;
means for enabling the first user to turn on or off remote control presentation through a selection made with the remote control user-interface (UI) element; and
means for sharing presentation data selected by the first user through the web application to other remote users depending on whether the remote control UI element is turned on or off.

20. A non-transitory computer readable storage medium having instructions stored therein which are configured when executed to cause at least one processor to control presentation in a web application among remote users over a data network, the stored instructions comprising:
- first logic configured to output to a first user a page in the web application having a remote control user-interface (UI) element configured to be shown in a browser tab or menu bar of a display view and to allow the first user to take control of the corresponding web application display at browsers of remote users;
- second logic configured to enable the first user to turn on or off remote control presentation through a selection made with the remote control user-interface (UI) element; and
- third logic configured to share presentation data selected by the first user through the web application to other remote users to view presented data depending on whether the remote control UI element is turned on or off.

* * * * *